US006172432B1

(12) United States Patent
Schnackenberg et al.

(10) Patent No.: US 6,172,432 B1
(45) Date of Patent: Jan. 9, 2001

(54) AUTOMATIC TRANSFER SWITCH

(75) Inventors: Paul Schnackenberg, Roswell, GA (US); George Oughton, Raleigh, NC (US)

(73) Assignee: Gen-Tran Corporation, Roswell, GA (US)

( * ) Notice: Under 35 U.S.C. 154(b), the term of this patent shall be extended for 0 days.

(21) Appl. No.: 09/335,950

(22) Filed: Jun. 18, 1999

(51) Int. Cl.[7] ............................... H02J 3/00; H01H 47/00
(52) U.S. Cl. ..................... 307/23; 307/64; 307/125; 307/29; 307/39; 361/170
(58) Field of Search ........................ 307/125, 130, 307/18, 64, 66, 23, 24, 29, 39; 361/166, 170, 187

(56) References Cited

U.S. PATENT DOCUMENTS

| | | |
|---|---|---|
| 1,132,741 | 3/1915 | Simon . |
| 2,326,070 | 8/1943 | Schaelchlin et al. ................. 171/97 |
| 2,410,677 | 11/1946 | Parkhurst .............................. 171/97 |
| 2,442,388 | 6/1948 | Wallace et al. ....................... 171/97 |
| 2,456,199 | 12/1948 | Lamb .................................. 171/119 |
| 2,745,971 | 5/1956 | Robertson ............................. 307/64 |
| 2,861,198 | 11/1958 | Soos, Jr. ............................... 307/64 |
| 2,917,635 | 12/1959 | Bloom et al. ......................... 290/30 |
| 3,636,368 | 1/1972 | Sia ....................................... 307/64 |
| 3,646,355 | 2/1972 | Ireland et al. ......................... 307/64 |
| 3,662,182 | 5/1972 | Ullmann et al. ...................... 307/64 |
| 3,691,393 | 9/1972 | Papchristou ........................... 290/30 |
| 3,697,709 | 10/1972 | Witkor ............................. 200/48 R |
| 3,778,633 | 12/1973 | De Visser et al. .................... 307/64 |
| 3,808,451 | 4/1974 | Pittet ................................... 307/64 |
| 3,936,782 | 2/1976 | Moakler et al. .................... 335/161 |
| 4,021,678 | 5/1977 | Moakler et al. ...................... 307/64 |
| 4,066,913 | 1/1978 | Manning et al. ..................... 307/38 |
| 4,090,090 | 5/1978 | Johnston .............................. 307/87 |
| 4,096,394 | 6/1978 | Ullmann et al. ...................... 307/46 |
| 4,099,692 | 7/1978 | Kolkman .............................. 246/34 |
| 4,157,461 | 6/1979 | Wiktor .................................. 200/18 |
| 4,189,649 | 2/1980 | Przywozny et al. ................. 307/64 |
| 4,204,128 | 5/1980 | Kruper ............................... 307/141 |
| 4,208,593 | 6/1980 | Sullivan ............................... 307/35 |
| 4,211,933 | 7/1980 | Hedges et al. ....................... 307/35 |
| 4,231,029 | 10/1980 | Johnston ............................ 340/658 |
| 4,310,770 | 1/1982 | Keener et al. ....................... 307/35 |
| 4,311,919 | 1/1982 | Nail ..................................... 307/64 |
| 4,345,162 | 8/1982 | Hammer et al. ..................... 307/39 |
| 4,384,213 | 5/1983 | Bogel ................................... 307/64 |
| 4,398,097 | 8/1983 | Schell et al. ......................... 307/64 |
| 4,405,867 | 9/1983 | Moakler et al. ...................... 307/64 |
| 4,423,339 | 12/1983 | Iverson et al. ....................... 307/64 |
| 4,476,398 | 10/1984 | Hallam ................................. 307/39 |
| 4,560,886 | 12/1985 | Ferguson ............................. 307/64 |
| 4,590,387 | 5/1986 | Yoshida et al. ...................... 307/64 |
| 4,672,227 | 6/1987 | Lagree et al. ........................ 307/64 |
| 4,747,041 | 5/1988 | Engel et al. ....................... 364/200 |
| 4,747,061 | 5/1988 | Lagree et al. ..................... 364/483 |
| 4,760,278 | 7/1988 | Thomson ............................ 307/64 |
| 4,761,563 | 8/1988 | Ross et al. ........................... 307/87 |
| 4,791,255 | 12/1988 | Eliezer ........................... 200/144 R |
| 4,804,933 | 2/1989 | Becker et al. ..................... 335/186 |
| 4,807,102 | 2/1989 | Serras-paulet ...................... 363/37 |
| 4,894,796 | 1/1990 | Engel et al. ....................... 364/900 |

(List continued on next page.)

* cited by examiner

Primary Examiner—Stephen W. Jackson
Assistant Examiner—Roberto Rios
(74) Attorney, Agent, or Firm—Dick and Harris

(57) ABSTRACT

An automatic transfer switch apparatus for use with a stand-alone generator, for supplying emergency power to a residence or small business. The automatic transfer switch apparatus is configured to sense a utility line failure, start up and stabilize the generator, and switch over the household circuits from the utility to the generator, and switch back when the utility recovers. A load-shedding feature is provided for shedding and restoring different circuits within the residence, that represent loads of different priority, with loads being shed and restored, according to their priority.

11 Claims, 12 Drawing Sheets

U.S. PATENT DOCUMENTS

| | | | |
|---|---|---|---|
| 4,935,861 | 6/1990 | Johnson, Jr. et al. | 363/132 |
| 4,988,889 | 1/1991 | Oughton, Jr. | 307/66 |
| 5,023,469 | 6/1991 | Bassett et al. | 307/64 |
| 5,070,252 | 12/1991 | Castenschiold et al. | 307/64 |
| 5,182,464 | 1/1993 | Woodworth et al. | 307/87 |
| 5,268,850 * | 12/1993 | Skoglund | 307/64 |
| 5,397,868 | 3/1995 | Smith et al. | 200/18 |
| 5,422,517 | 6/1995 | Verney et al. | 307/29 |
| 5,436,511 | 7/1995 | Nigawara et al. | 307/39 |
| 5,498,913 | 3/1996 | Moritani | 307/64 |
| 5,502,634 | 3/1996 | Lavrisa | 363/101 |
| 5,532,525 | 7/1996 | Kaiser et al. | 307/64 |
| 5,534,734 | 7/1996 | Pugh et al. | 307/38 |
| 5,536,976 | 7/1996 | Churchill | 307/11 |
| 5,559,704 | 9/1996 | Vanek et al. | 364/431.01 |
| 5,563,802 | 10/1996 | Plahn et al. | 364/492 |
| 5,581,133 | 12/1996 | Smith et al. | 307/64 |
| 5,612,580 | 3/1997 | Janonis et al. | 307/64 |
| 5,619,077 | 4/1997 | Green et al. | 307/64 |
| 5,635,772 | 6/1997 | Lagree et al. | 307/64 |
| 5,638,295 | 6/1997 | Lagree et al. | 364/492 |
| 5,646,459 | 7/1997 | Hatate et al. | 307/85 |
| 5,656,871 | 8/1997 | Lee | 307/66 |
| 5,680,301 | 10/1997 | Oughton, Jr. et al. | 363/132 |
| 5,729,059 | 3/1998 | Kilroy et al. | 307/84 |
| 5,739,594 | 4/1998 | Sheppard et al. | 307/64 |
| 5,745,670 | 4/1998 | Linde | 395/182.2 |
| 5,747,887 | 5/1998 | Takanaga et al. | 307/64 |
| 5,748,432 | 5/1998 | Przywozny et al. | 361/159 |
| 5,751,564 | 5/1998 | Dien | 363/37 |
| 5,767,591 | 6/1998 | Pinkerton | 307/64 |
| 5,784,240 | 7/1998 | Przywozny | 361/85 |
| 5,831,345 | 11/1998 | Michaud | 307/38 |
| 5,903,065 * | 5/1999 | Dragos | 307/64 |

AUTOMATIC TRANSFER SWITCH

BACKGROUND OF THE INVENTION

1. Field of the Invention

The present invention relates to the technical field of transfer switches, for use with portable or stationary electric generators. In particular, the present invention is directed to an automatic transfer switch apparatus.

2. The Prior Art

Transfer switches, for use in association with portable or stand-alone electrical generators, are known in the prior art.

A private residence, for example, may normally receive its electrical power from a utility company. For various reasons, however (location in a region prone to severe weather, etc.), the homeowner may desire a back-up source of electrical power, so that comfort or at least habitability of the residence can be maintained, during periods in which utility power is unavailable.

Typically, a gasoline, diesel, propane or natural gas internal combustion engine-powered electrical generator, capable of generating split-phase alternating voltage, may be installed in or near the residence, and arranged to be connected to one or more of the electrical circuits in the residence in order to provide the desired back-up power.

However, one cannot simply leave the back-up generator permanently connected, in parallel with the utility power, to the residential electrical circuits, nor can one simply connect and power up a back-up generator, without first disconnecting the residential circuits from the power lines coming in from the utility. The reason for this is the possibility that some of the current generated by the back-up generator may inadvertently be backfed into the utility power lines, which may lead to personal injury and/or damage to utility equipment (transformers, etc.).

Transfer switches have been provided to establish the electrical connections between the utility, the residential circuit(s) and the back-up generator. Prior art residential transfer switches typically have been manually actuated devices; known as "break, then make" switches. This means that when the switch is thrown, the connection between the residential circuit(s) and whichever current source is at the time actually connected to the residential circuit, is broken, before the connection is made between the residential circuit, and the current source which is being substituted in.

In a typical situation, utility power fails or falls drastically. The residence owner proceeds to start up the back-up generator, and once operating speed and voltage have been attained, the switch is manually thrown, to disconnect the utility from the residential circuit, and thereafter, cut in the current from the back-up generator.

Prior art manual transfer switches are capable of providing the simple function of serving to safely accomplish the substitution of power sources. However, such prior art manual switches require the presence of the homeowner, in order to accomplish the transfer. This may be undesirable, in that some appliances (e.g., refrigerator or freezer, sump pump, etc.) should not go without power for extended periods of time. If a homeowner is absent for more than an hour or two, continued power outages may cause potentially serious damage or injury to equipment, property, pets, etc.

Accordingly, it would be desirable to provide a transfer switch for residential/small business environments and the like, that is capable of actuating automatically, upon sensing a sustained interruption of utility-supplied electrical power.

It would also be desirable to provide an automatic transfer switch, that is capable of starting a back-up generator, upon sensing a sustained interruption of utility-supplied electrical power, and disconnecting the utility and connecting the back-up, when the back-up generator is capable of assuming the load.

These and other desirable characteristics of the invention will become apparent in light of the present specification, claims and drawings.

SUMMARY OF THE INVENTION

The present invention is directed to an automatic transfer switch apparatus for use in association with a stand-alone generator, for enabling a stand-alone generator to supply electrical power to a plurality of electrical circuits of a structure, such as a residential structure, in the event of failure of electrical power being supplied to the structure by an electrical utility.

The automatic transfer switch apparatus comprises a plurality of electrical utility inputs, operably configured to be connected to a corresponding plurality of outputs from a residential electrical distribution box, which outputs are connected, at least indirectly, to a utility voltage source. A plurality of electrical residential outputs are operably configured to be connected to selected ones of specific electrical circuits within the residence. A plurality of electrical generator inputs are operably configured to be connected to the voltage output of a stand-alone electrical generator.

A plurality of switches are provided, corresponding and connected to respective ones of the plurality of electrical residential outputs. Each switch is operably configured for switching between two contact positions, a first contact position connecting at least one electrical residential output to at least one electrical utility input, and a second contact position connecting the at least one electrical residential output to at least one electrical generator input, the switches being actuatable to move from one of the contact positions to the other of the contact positions, upon receipt of an actuation signal.

A controller is operably configured, following installation of the automatic transfer switch, and connection of same to the voltage outputs and starter circuit of a stand-alone generator, to selected ones of the outputs of a residential electrical distribution box, and to the selected ones of the specific electrical circuits of the residence, to detect utility voltage failure, subsequently start the generator, monitor output voltage of the generator, and, upon detection of a minimum nominal output voltage from the generator, and generate actuation signals to cause the switches to move from respective ones of the contact positions to respective others of the contact positions.

The controller is further operably configured to transmit actuation signals to corresponding ones of the switches, according to a preselected prioritized hierarchy, corresponding to prioritized ones of the specific electrical circuits of the residence, wherein switches corresponding to higher priority residential electrical circuits will be actuated to connect the generator output to the residential circuit, before switches corresponding to lower priority residential circuits are actuated to connect the generator output to the residential circuit.

The controller is also operably configured to continue to actuate switches corresponding to successively lower priority residential circuits, until total load on the generator exceeds a predetermined maximum load, The controller is further operably configured to substantially continuously monitor total loading on the generator, de-actuate switches corresponding to lower priority residential circuits, in ascending order of priority, when total load on the generator exceeds a predetermined maximum load, and subsequently reactuate switches corresponding to residential circuits in descending order of priority, when the total load drops below the predetermined maximum load.

In a preferred embodiment of the invention, the switches comprise relay switches, which are biased in unactuated first contact positions, connecting electrical residential outputs to electrical utility inputs, and which, upon actuation, are moved to actuated second contact positions, connecting the electrical residential outputs to electrical generator outputs. Preferably, the switches are solenoid-driven relay switches.

A utility voltage sensor may be provided which is operably configured to be connected, at least indirectly, to selected ones of the outputs of a residential electrical distribution box. The selected ones of the outputs of the residential electrical distribution box correspond to electrical circuits of the residence being designated as having highest priority for supply of electrical power. The utility voltage sensor is operably configured to transmit a signal to the controller representative of voltage from the utility voltage source. The controller reads and evaluates the signal and decides, based upon preselected parameters, whether the voltage is acceptable or insufficient (failure).

A generator voltage sensor may be operably configured to be connected, at least indirectly, to the outputs of a generator, for sensing the output voltage of the generator. The generator voltage sensor is preferably configured to transmit a signal to the controller representative of voltage from the generator. The controller reads and evaluates the level of the signal and decides, based upon preselected parameters, whether the voltage is acceptable or insufficient (failure).

A plurality of switch drivers may be operably connected to the controller and to the plurality of switches, for successively actuating and deactuating the switches, in accordance to control signals received from the controller.

A generator load current sensor may be operably configured to be connected, at least indirectly, to the electrical generator inputs, for sensing the total load current of the residential circuits on the generator. The generator load current sensor may be configured to transmit a signal to the controller representative of a generator loading imposed by the residential circuits. The controller reads and evaluates the level of the signal and decides (based on preselected parameters) whether the load is acceptable or excessive.

In a preferred embodiment of the invention, the controller is further operably configured to automatically exercise the generator at predetermined regular intervals.

The controller may be configured to monitor at least one of total elapsed running time of the generator and total elapsed time since last maintenance, and to provide at least one alarm to an operator to provide maintenance of the generator after a predetermined total elapsed time.

In a preferred embodiment of the invention, the controller further comprises a display and input panel for enabling an operator to input into programmable memory instructions for a plurality of control parameters. The display and input panel preferably contains at least one of a plurality of LEDs, an alphanumeric LCD and at least one of a plurality of pushbuttons, an alphanumeric keypad.

The controller preferably comprises at least one of non-volatile preprogrammed memory, writable memory for storage of data inputted by an operator, writable memory for storage of data representative of numerical values for electrical conditions sensed by the automatic transfer switch apparatus.

BEST MODE FOR CARRYING OUT THE INVENTION

Figure 1A:
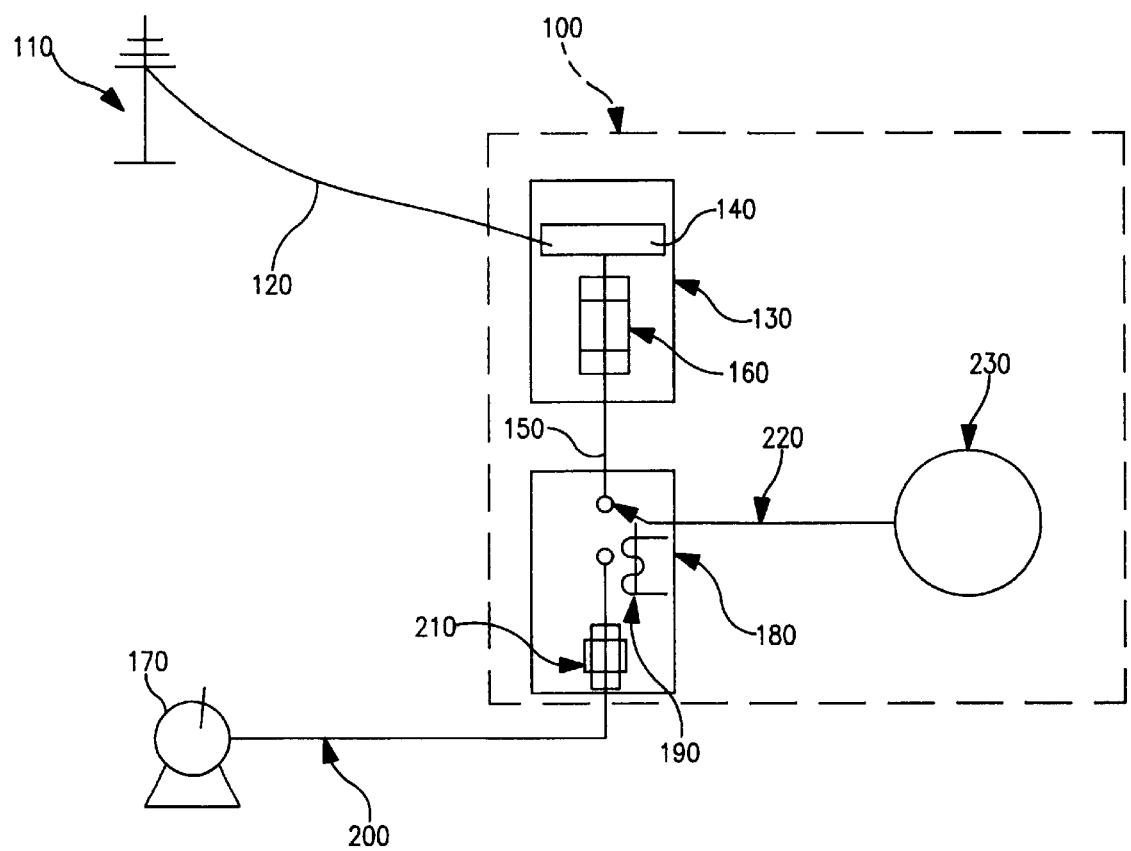
FIG. 1a is a schematic of a power supply system for a residence that is provided with a back-up generator, as well as utility power.

While this invention is susceptible of embodiment in many different forms, there is shown in the drawings and will herein be described in detail, a specific embodiment, with the understanding that the present disclosure is to be considered as an exemplification of the principles of the invention and is not intended to limit the invention to the embodiment illustrated.

FIG. 1a is a schematic "single-line" diagram, demonstrating the general environment of the automatic transfer switch, of the present invention. While only single lines are shown in FIG. 1a, it is understood that each line actually represents phase A and phase B wires. Likewise, it is understood that a typical residence will have numerous outputs from the bus bar in the breaker box.

In the absence of a generator and transfer switch, a typical residence 100 receives utility power 110, in the form of line 120, that connects to a residential electrical distribution box, typically a breaker box, in which the incoming line A, B and neutral lines connect to separate bus bars, and then several lines, representing the several household circuits, emanate from the bus bar. Typically, each output from the A and B bus bars has a circuit breaker in it.

In the simplified set-up of FIG. 1a, the utility lines A, B and neutral enter the breaker box 130 of the residence, and connect to bus bars 140. From bus bars 140, one or more outputs 150 pass through respective circuit breakers 160, and onto the various household circuits. In a household that is provided with a back-up generator 170, as shown in FIG. 1a, output(s) 150 are instead routed to transfer switch 180, that contains one or more relays 190, switchable between the output(s) 150 and the output(s) 200 (through circuit breaker (s) 210). Output(s) 220 then lead to the load(s) 230 for the residence.

Figure 1B:
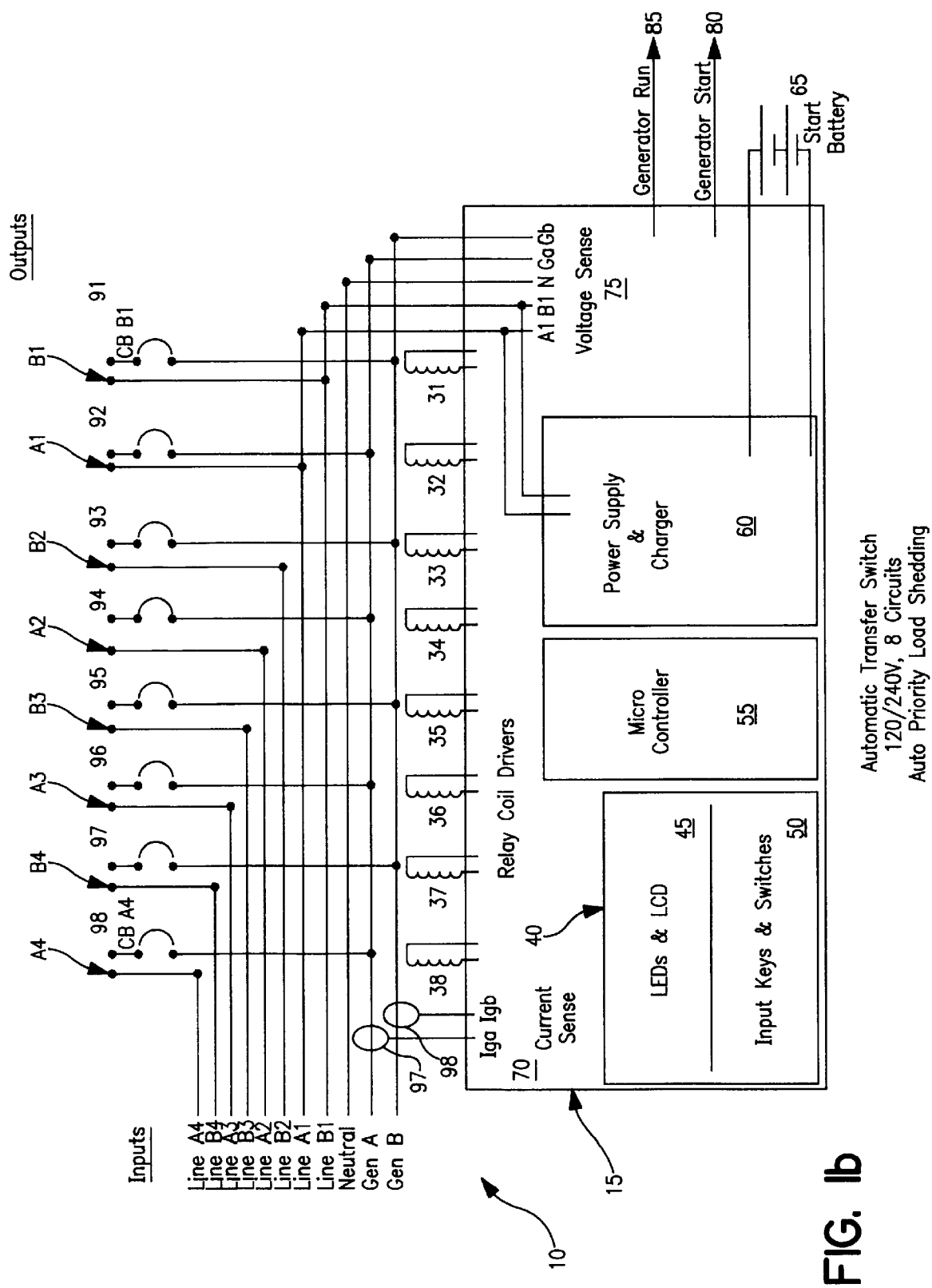
FIG. 1b is an overall system schematic/block diagram of the automatic transfer switch of the present invention.
Figure 2A:
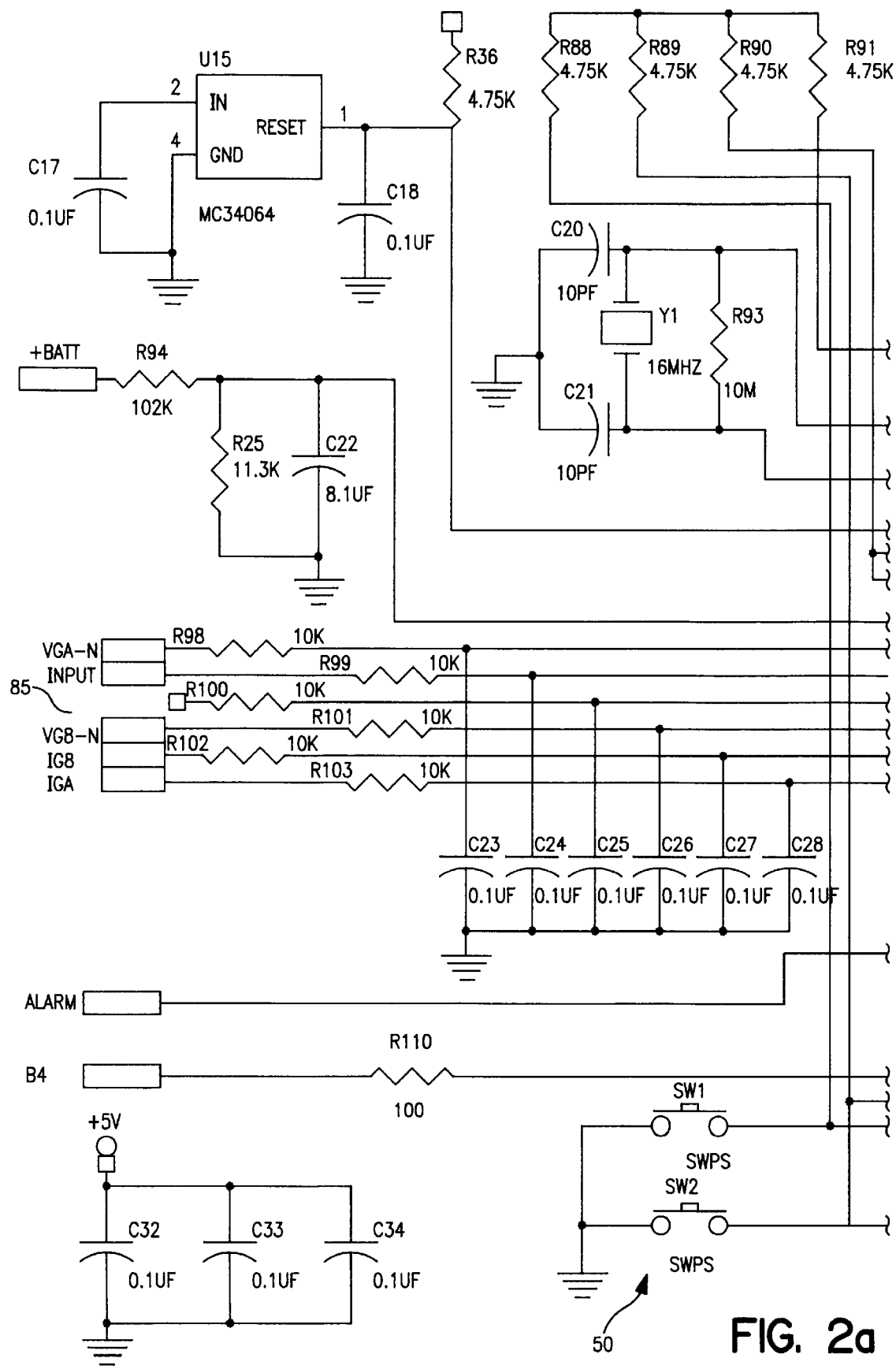
FIG. 2 is a detailed circuit diagram for the microcontroller for the automatic transfer switch of the present invention.
Figure 2B:
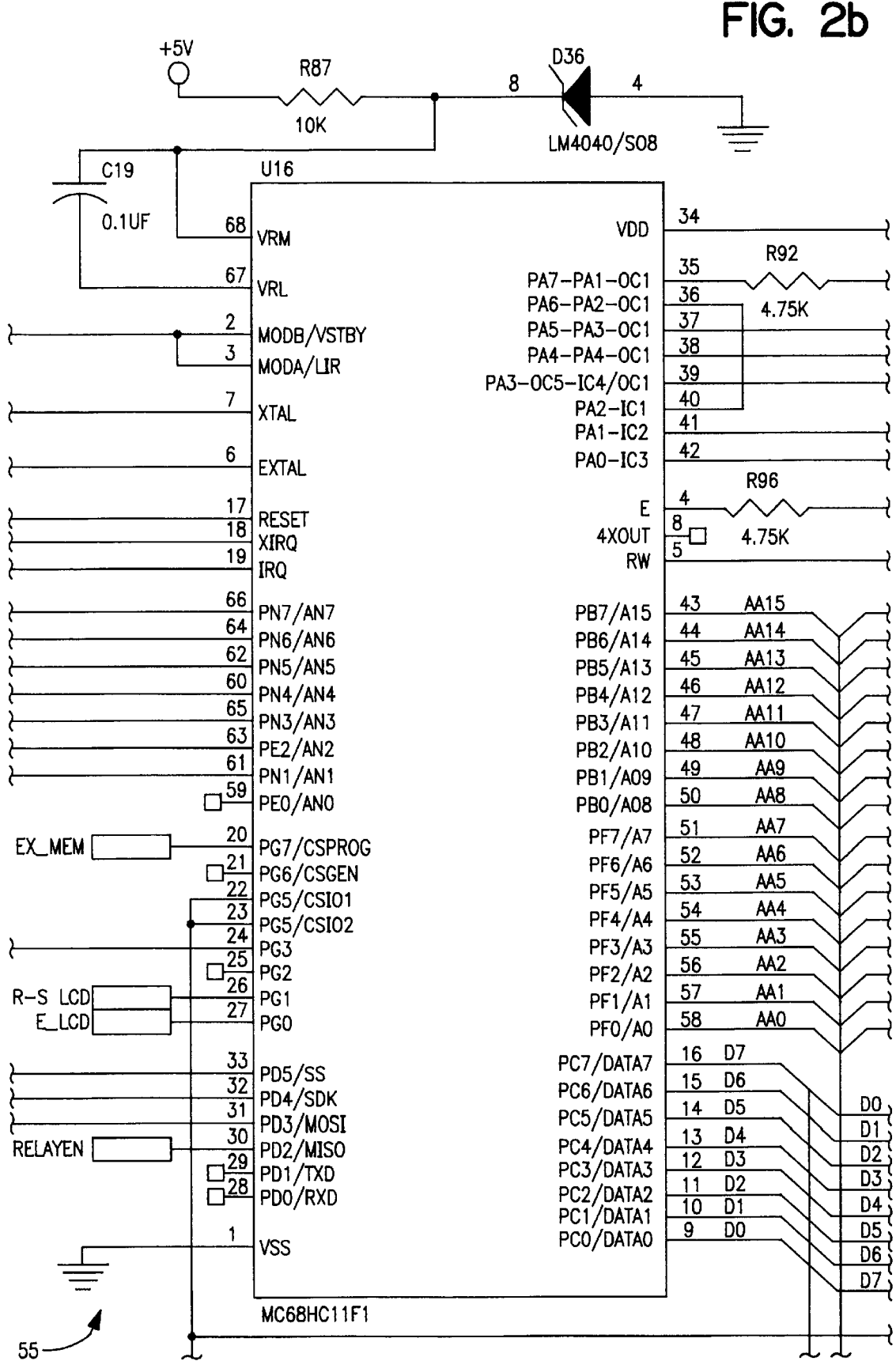
Figure 2C:
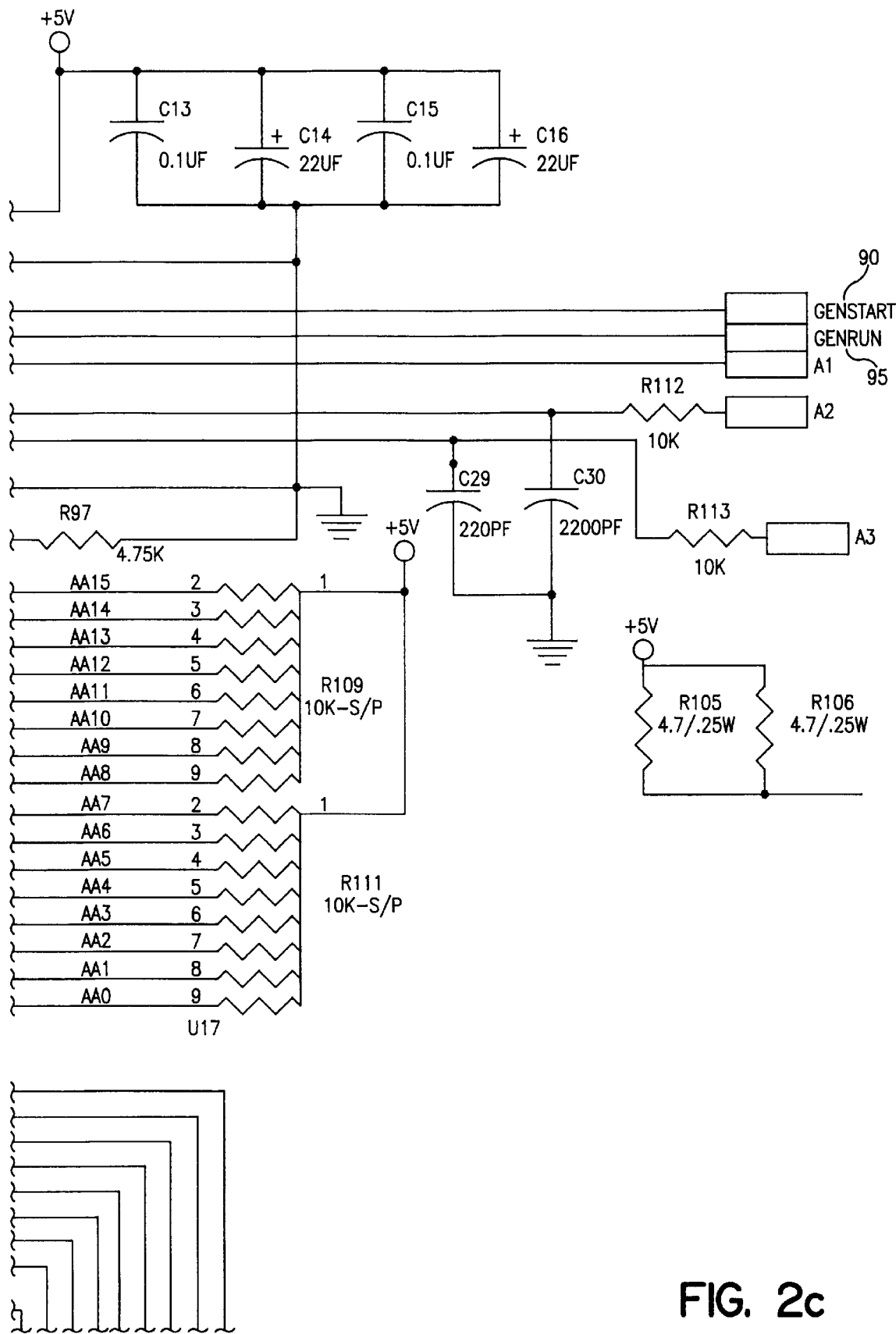
Figure 2D:
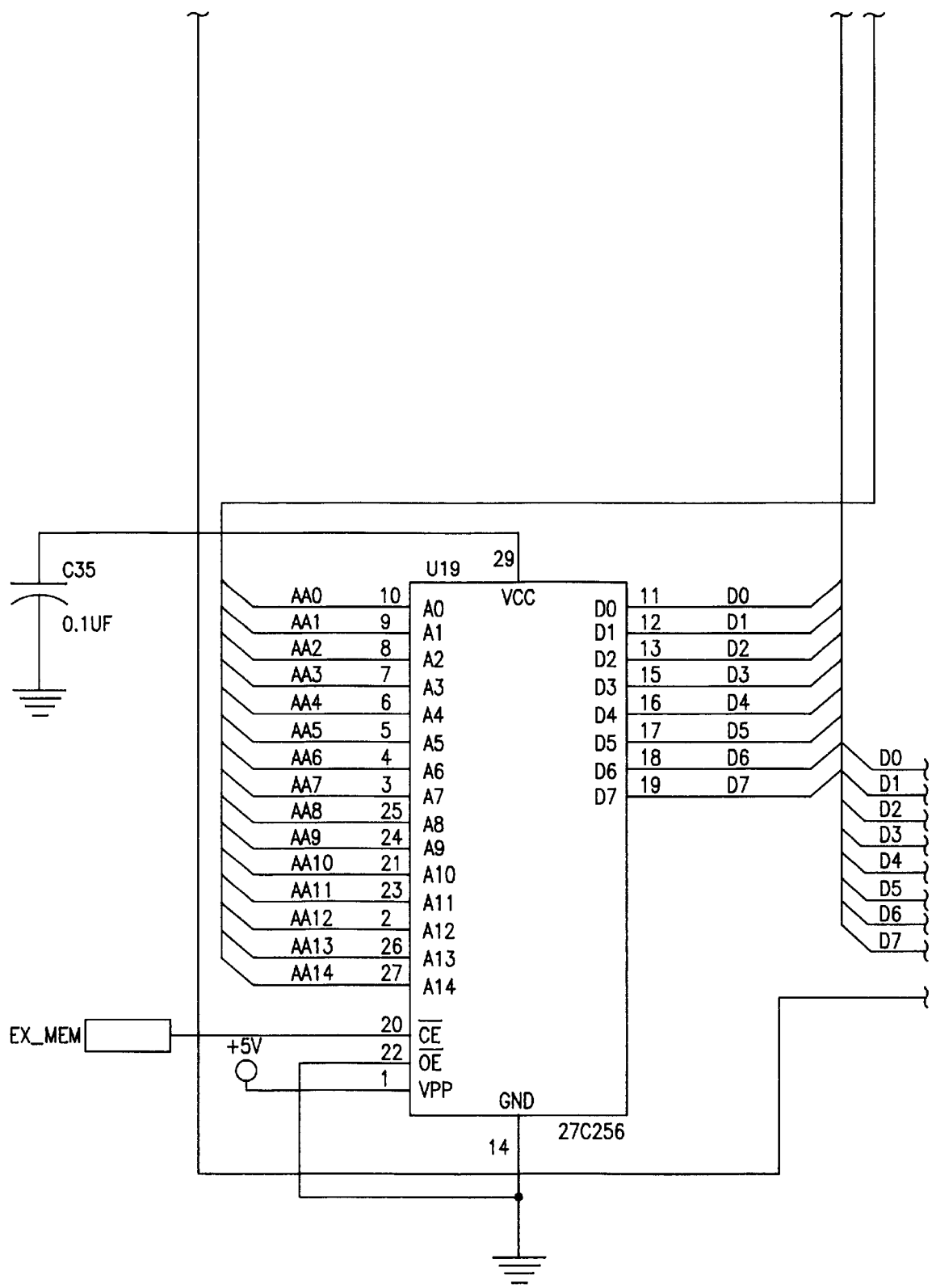
Figure 2E:
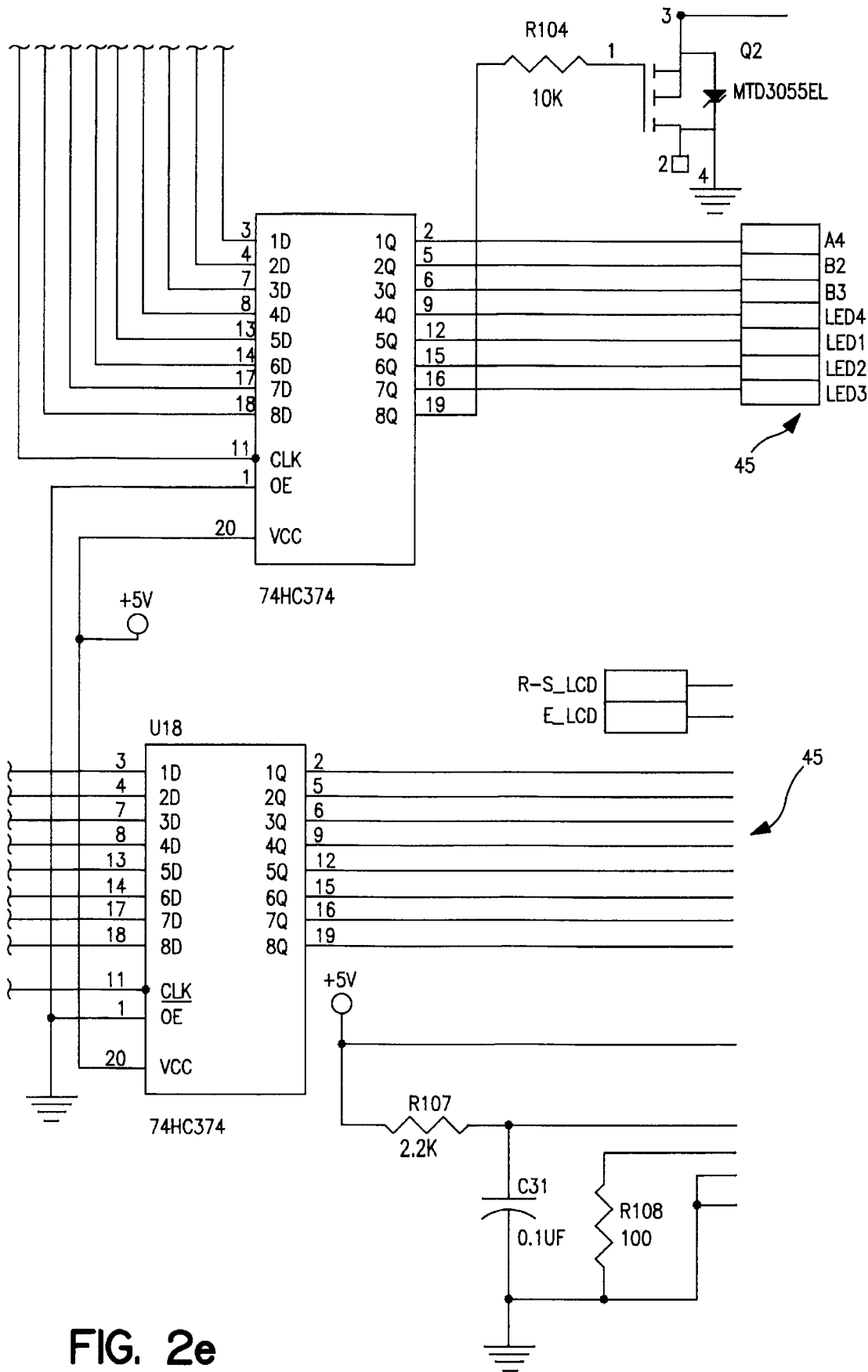

FIG. 1b is an operational schematic for the automatic transfer switch of the present invention. Transfer switch apparatus 10 includes control apparatus 15, and single pole double-throw relays 31–38 (wherein the electrical contacts for switching the circuits are mounted (e.g., by mechanical linkages) to the moving armatures of the solenoid portions of the relays), that are, in turn, associated with output lines A1–B4. Inputs Line A1-Line B4 represent the incoming utility lines. Output lines A1–B4 represent specific residential circuits (e.g., lighting, refrigerator, sump pump, etc., or combinations thereof), to which current is to be supplied, in the event of a utility line voltage interruption.

Typically, in prior art back-up generator arrangements, not all household circuits could be covered by the back-up generator operation, unless the generator had an unusually large load capacity. In order to enable a more moderately sized generator to be used (e.g., on the order of 10 kW output at 120/240V); the present invention is configured to have a load-shedding feature, described in further detail herein. By using load shedding, lower priority circuits can be energized, when the loads of higher priority circuits drop out, and more circuits of the household can potentially be supplied with power.

Figure 11:
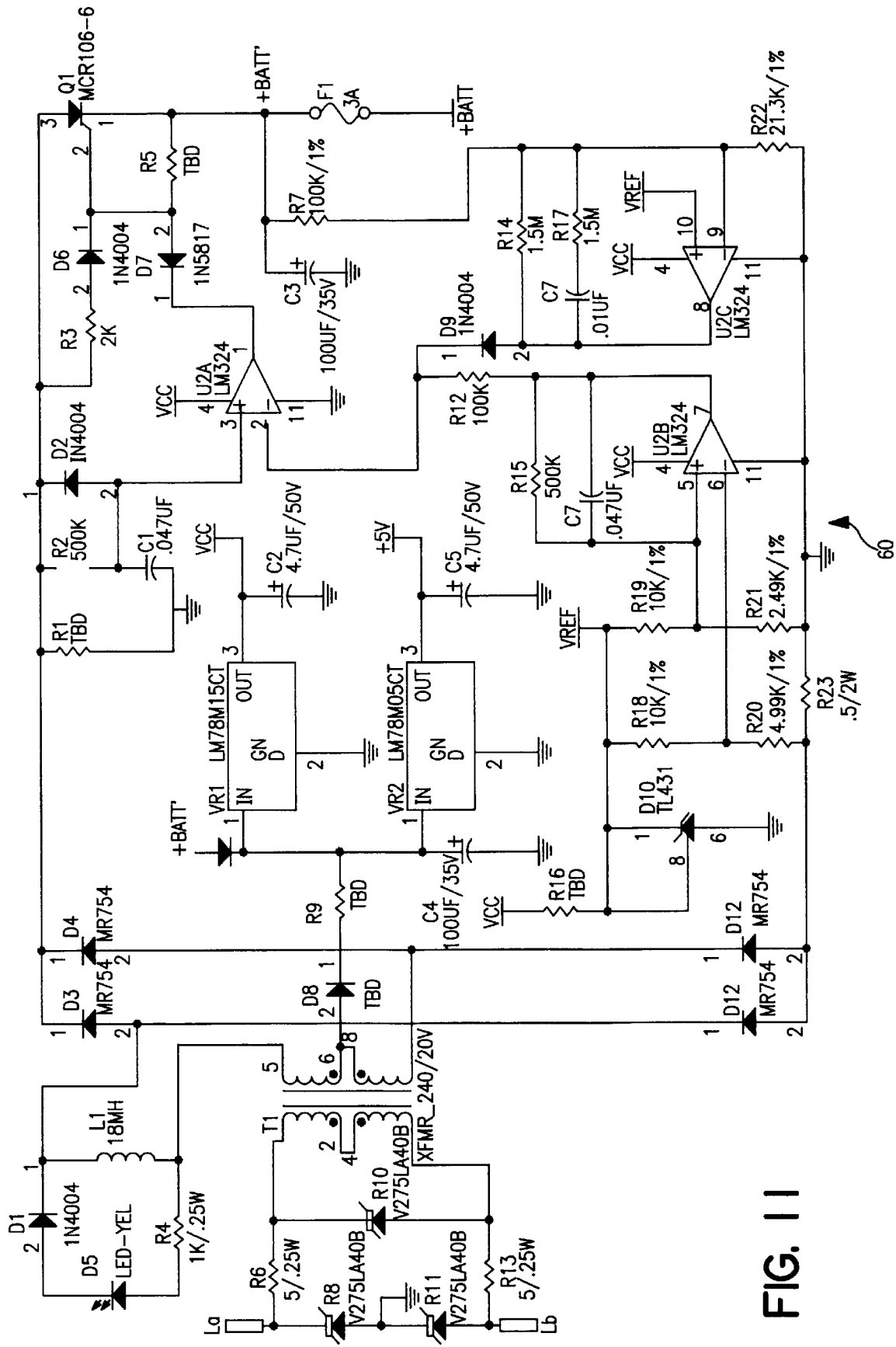
FIG. 11 is a circuit diagram for the start battery charger/power supply for the automatic transfer switch of the present invention.

Control apparatus 15 includes control panel 40, with appropriate display LEDs and LCD 45, and input keys and/or switches 50. In a preferred embodiment of the invention, it is contemplated that two pushbutton switches will be employed, that will permit the inputting of instructions, through the pressing of the buttons in different combinations of order and/or duration, in a manner known in the art of keypad input devices. Suitably programmed and connected microcontroller 55 governs the operation of automatic transfer switch 10. Power supply 60 (FIGS. 11), that can be powered by either line voltage or by start battery 65 (when line voltage is unavailable), supplies power to microcontroller 55, control panel 40, relays 31–38, and other sensors of control apparatus 15. Alternatively, the power for actually energizing the relays may be provided by the generator, when running. Preferably, power supply 60 includes a battery charger (FIG. 11) that is configured to operate at 1A, 12V nominal, and is powered by line current when the utility line is valid. Typically, the generator contains a charger to recharge the battery while the generator is running.

Transfer switch 10 may be configured and microcontroller 55 may be programmed, to monitor battery voltage during the time of line loss, but before generator start up. During that time, the control circuit is placing a load on the battery. If the battery is "healthy", the voltage should not dip significantly. In addition, microcontroller 55 could be configured to monitor the time and lowest voltage of the battery during generator cranking, so that if the time is too long or voltage is too low, an indication will be given on the display that engine and/or battery check is needed.

Transfer switch 10 is configured for use in association with a back-up generator (not shown), that has an electric ignition system and that is configured for remote starting.

Such generators are known in the art, and are manufactured by many companies, including Honda, among others. Such a generator will have a separate rechargeable start battery 65. Power supply 60 will be connected to start battery 65, for recharging and maintaining start battery 65 between uses.

Electrical inputs into transfer switch 10 include lines Line A1—Line B4, neutral (all coming from the residence breaker box—not shown in FIG. 2), and generator A, B and neutral feeds. Current sensor 70, which may be of conventional configuration, is operably connected to generator A and B circuits, for monitoring the current supplied by the back-up generator. A portion 75a of voltage sensor 75 (shown in FIG. 3), which may be of otherwise conventional configuration, is connected to Line A1, Line B1 and neutral (from the breaker box—being the highest priority outputs, they may be deemed, for most applications, to be sufficiently representative of the total utility voltage), as well as to the incoming generator lines Ga and Gb (the portion 75b of voltage sensor 75 shown in FIG. 4).

Control apparatus 15 is further configured to transmit two signals to the generator, generator start signal 80 and generator run signal 85.

Circuit breakers 91–98 (analogous to the single circuit breaker 210, of simplified schematic 1a) are provided for protection of the generator supply lines for circuits A1–B4.

FIGS. 2–11 are circuit diagrams for the various operational circuits for the automatic transfer switch. FIG. 2 is a circuit diagram for microcontroller circuit 55, showing also control for input switches and keys 50 and LCD and LED 45. Microcontroller 55 is preferably suitably programmed, employing otherwise conventional programming techniques, to accomplish the procedural steps identified herein.

Microcontroller U16 is the chip that performs processing functions, and that stores in internally writable transient memory, such information as time between test starts of the system, -total elapsed time running during a given period of back-up power generation, etc. Chip U19, an EEProm, contains user configuration data and other nonvolatile data recorded in memory. FIG. 2 illustrates, in part, the clock circuitry for microcontroller 55.

To the extent that numerical values are provided in any of FIGS. 2–11, for the various circuitry components, such numerical values are intended to be examples of a preferred embodiment. It is understood that such numerical values are not intended to limit the scope of the invention, and that variation in the selection of the specific components may be made by one of ordinary skill in the art, having the present disclosure before them, without departing from the scope of the present invention.

To the extent that a kind of circuitry component is shown (e.g., resistor, capacitor, transistor, etc.), but no specific numerical value is provided, it is to be understood that determination of appropriate numerical values for such components may be readily arrived at by one of ordinary skill in the art, having the present disclosure before them, without undue experimentation or calculation.

Appropriate electrical connections, consistent with the descriptions herein describing the transmission of signals between various circuitry illustrated herein, is presumed, and may be readily provided by one of ordinary skill in the art, having the present disclosure before them. In addition, appropriate electrical connections, to a back-up internal combustion engine-powered electrical generator, of the kind capable of being started from a remote location, via a start signal to an electric starter mechanism, is presumed. Such back-up generators are known in the prior art, with Honda being one such manufacturer.

The automatic transfer switch of the present invention is configured to be connected to such a conventional generator. Accordingly, the generator, and the hardwire connections, from the transfer switch 10 of the present invention, thereto (apart from the GENSTART and GENRUN signals described herein) have been omitted as being unnecessary for a complete understanding of the invention.

Figure 3:
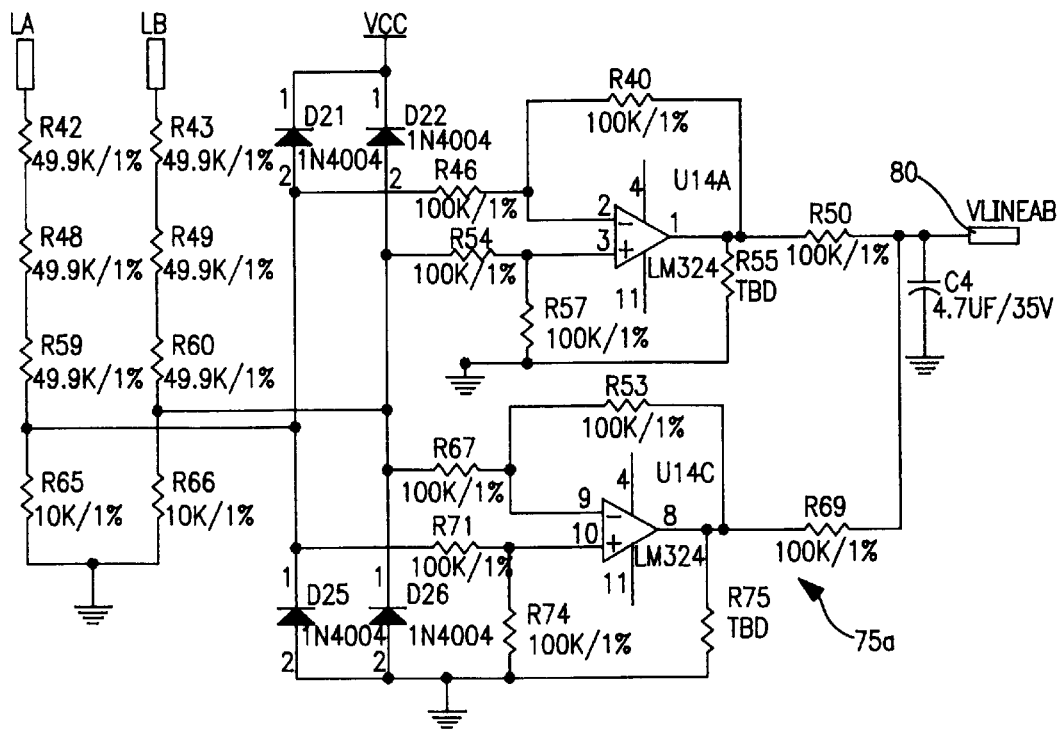
FIG. 3 is a circuit diagram for a signal conditioning circuit for the line voltage sensing circuit of the microcontroller for the automatic transfer switch of the present invention, for detecting utility failure.

Operation of automatic transfer switch 10, with reference to the several drawings, commences with monitoring the utility line voltage, by monitoring the representative load on input Lines A1, B1 of FIG. 1*b*. A portion 75*a* of voltage sensor 75 is shown in FIG. 3, in that a direct sensing of the voltage of both input Line A1 and input Line B1 phases of the utility-supplied line voltage is converted into a DC signal voltage $V_{LINEAB}$ 80 (FIG. 3). Signal voltage $V_{LINEAB}$, of FIG. 3, is the same as the input signal designated "INPUTV" 85, that is directed into microcontroller chip U16 (FIG. 2) of microcontroller 55.

Microcontroller chip U16 is suitably programmed, using conventional programming techniques, to monitor INPUTV 85. If INPUTV 85 drops sufficiently below (approximately 70%–90% of) a preselected minimum value (that represents nominal acceptable utility line voltage) and remains below that preselected minimum value for a preselected amount of time (e.g., 30 seconds–10 min.), then the operational programming of switch 10 resident in chip U16 determines that utility line failure has occurred, and startup of the back-up generator (not shown) is initiated. Microcontroller 55 will be suitably programmed, so that line loss thresholds, both voltage and duration can be configured by the user/installer using the pushbotton switches of the display panel, with the numeric or alphanumeric LCD display to scroll, increment, and select among available choices.

Following a determination of sustained utility failure, microcontroller chip U16 creates GENSTART signal 90 and GENRUN signal 95 (FIGS. 1*b* and 2). Generator start driver 91 (FIG. 10), to engage an electric starter circuit of the back-up generator (engage starter solenoid and spin up starter motor) senses GENSTART signal 90. GENRUN signal 95 is sensed by generator run driver 96 (FIG. 9), to provide a control signal for an ignition circuit and coil and/or a fuel control valve, as described in further detail herein.

Preferably, microcontroller 55 will be programmed to generate an initial start signal (GENSTARTPU) for a set period of time (e.g., five seconds), wait a period of time (e.g., 20 seconds), while the voltage sensor 75, and associated circuitry and programming determines whether, by the voltage output, the generator has in fact started. At the same time that the start signal is given (equivalent to turning the key to the start position in a car), a continuous "run" signal is also generated, FIG. 9. The run signal may be a simple energization of the ignition coil and/or a signal to hold open a normally closed fuel supply valve.

If a valid initial generator output voltage has not been attained, then the start cycle will be repeated a set number of times (e.g., two cycles), until either the generator starts, or the number of cycles is exhausted. In the latter event, the microcontroller 55 ceases sending start signals, disables the run signal, and instead causes a failure indication to be made on the display 40, either by illuminating a dedicated LED, or by an numeric or alphanumeric message on an LCD display. FIG. 2 illustrates the signals for actuating, for example, LEDs, LCDs and an alarm.

After the back-up generator motor has been started, the electric starter is disengaged (GENSTARTPD). Microcontroller chip U16 continues to generate a continuous GENRUN signal 95.

Figure 4:
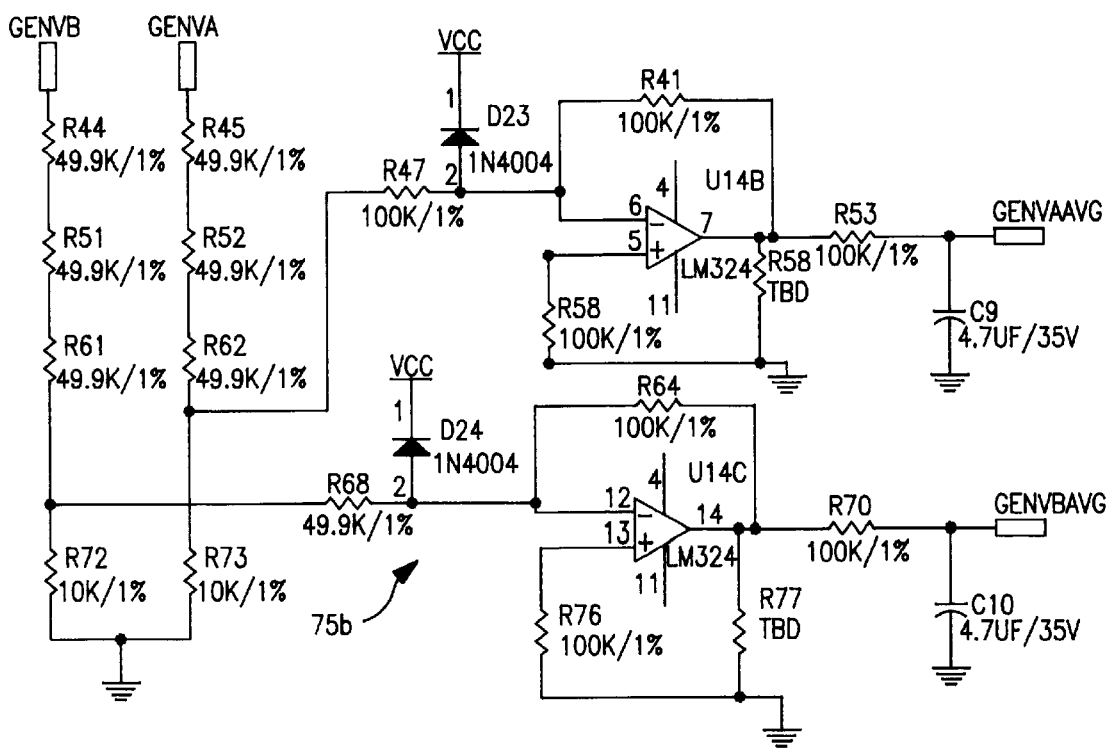
FIG. 4 is a circuit diagram for a signal conditioning circuit for monitoring generator output voltage, for verifying generator output.

The portion 75*b* of voltage sensor 75 of transfer switch 10 verifies the proper operation of the generator by sensing the output voltage of the back-up generator. See FIGS. 2 and 4. Specifically, inputs GENVA and GENVB represent the actual voltages generated by the generator. Output signals GENVAAVG and GENVBAVG from portion 75*b*, of FIG. 4 are the same as input signals $V_{GA-N}$, $V_{GBN}$, of FIG. 2, to microcontroller chip U16 of microcontroller 55.

In an alternative embodiment of the invention, in which a more complex generator is used, that is capable of external remote control of the fuel valve or throttle setting between full open and full closed, and/or variable control of ignition, microcontroller 55 may be programmed to provide a GENRUN signal that provides such control of engine speed.

Figure 7:
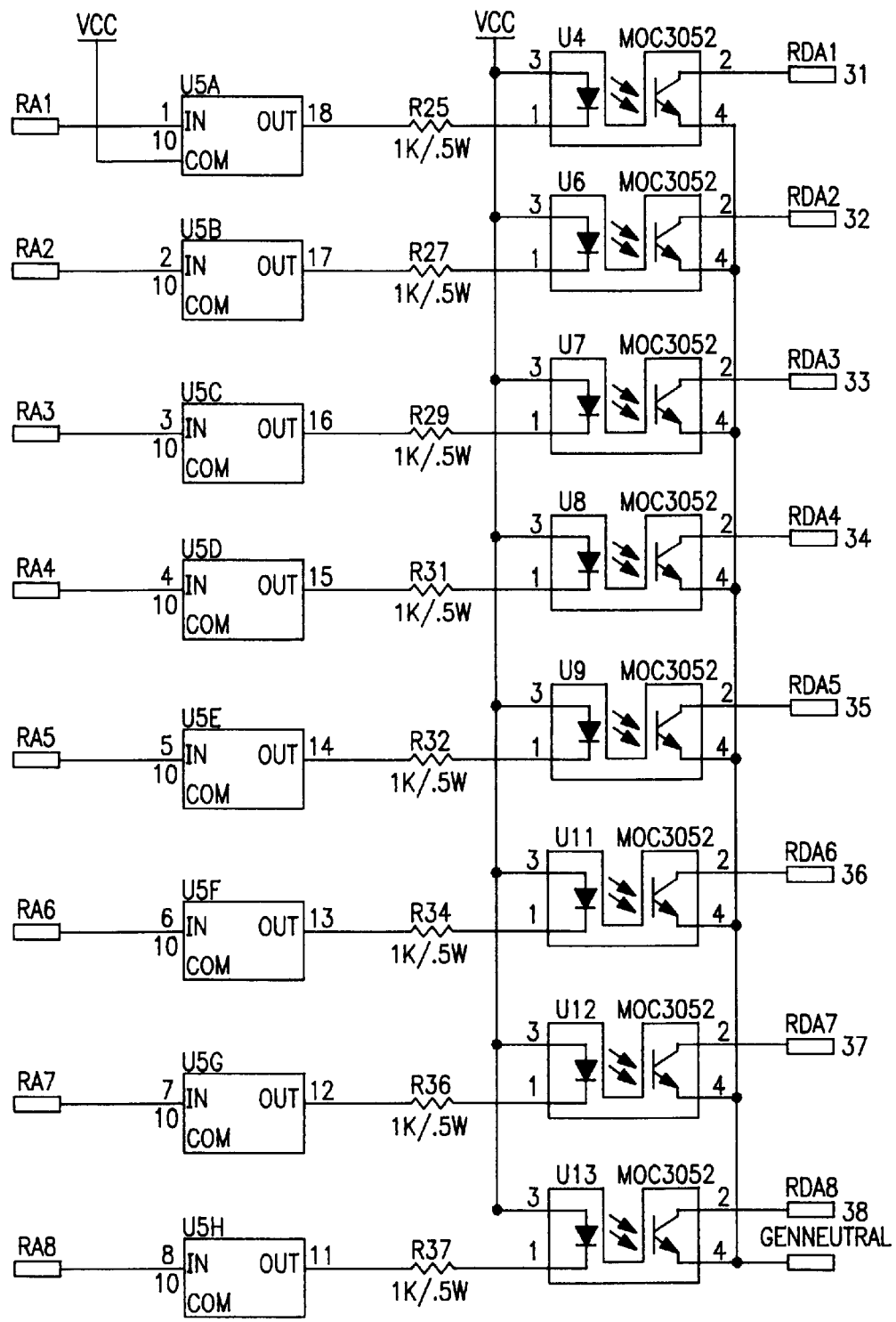
FIG. 7 is a circuit diagram for the relay switch solenoid drivers, for the automatic transfer switch of the present invention.
Figure 8:
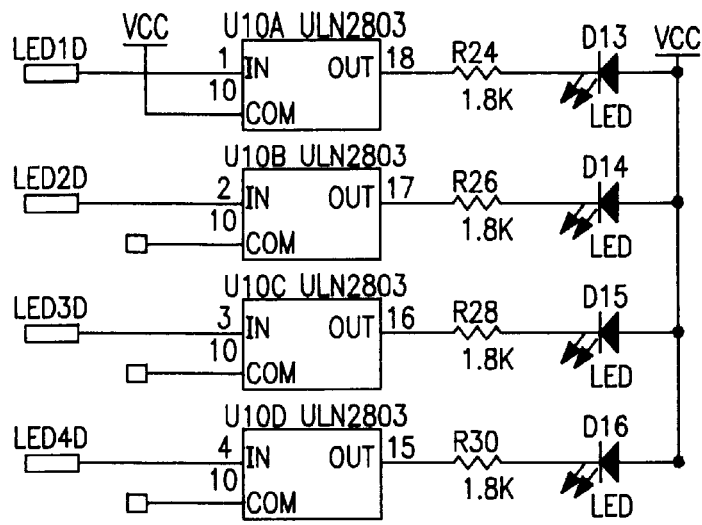
FIG. 8 is a circuit diagram for the LED drivers for the display for the automatic transfer switch of the present invention.
Figure 9:
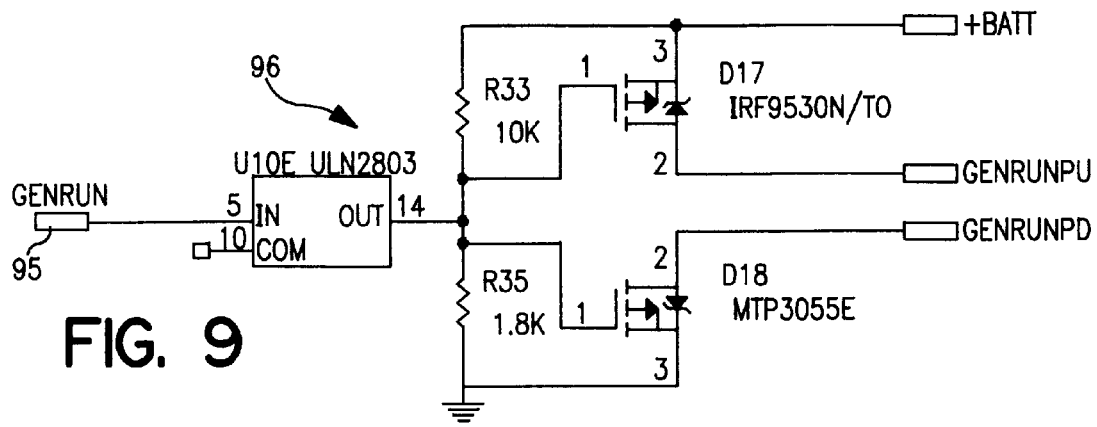
FIG. 9 is a circuit diagram for the generator run signal driver, for the automatic transfer switch of the present invention.
Figure 10:
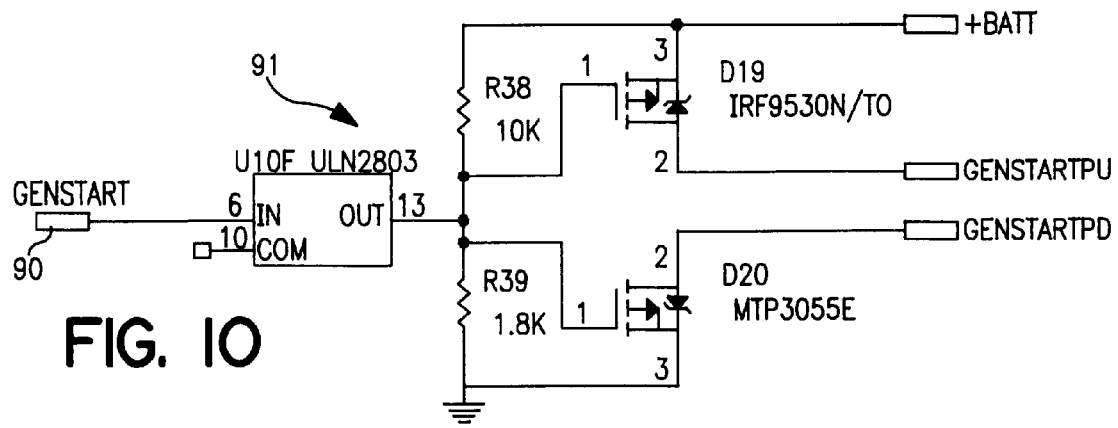
FIG. 10 is a circuit diagram for the generator start signal driver, for the automatic transfer switch of the present invention.

Once valid generator output voltage has been established, microcontroller 55 proceeds to switch away from the failing utility line. FIG. 7 illustrates the drivers for the relays for each of circuits A1–B4. Photo triacs (opto-isolators) may be employed, for controlling the solenoid actuating currents, and to isolate microcontroller 55 from the high currents and voltages (preferably provided by the generator or utility) used to actuate the solenoids.

As an example of operation, according to its programming, U16 determines that the relays controlling output lines A1, B1 should be switched from utility to generator input. Presuming that the relays for those lines are, in their unactuated state, defaulted to positions holding the switches in positions connecting the utility, then supplying power to the solenoids causes them to move to the utility off, then generator on, positions.

Referring to FIG. 7, connections to relays 31–38 are designated by RDA1–RDA8, for circuits A1–B4, respectively. Outputs A1–B2 of microcontroller chip U16 correspond to inputs RA1–RA8, of the relay drivers illustrated in FIG. 7. For example, U16 "toggles" the RA1 signal to "high" that in turn is inverted to a "low" signal at node 1. This enables current to be pulled through the corresponding LED. The diode, in turn signals the corresponding triac X1, which permits current to flow through relay RDA1, switching from utility to generator voltage source. A similar process is used to drive relay RDA2. The use of break-before-make single pole-double throw relay switches precludes the possibility of feedback of generator current into the utility line during switchover. Likewise, upon return from generator operation to utility supply, the use of such switches precludes feedback of utility current into the generator lines.

Once microcontroller chip U16 determines a sustained power failure has occurred, it then proceeds to switch over household circuits A1–B4, from utility to generator voltage, in descending order (A1, B1, A2, B2, etc.), to the extent that the generator current supply limitations permit. As mentioned above, the circuits A1–B4 are prioritized, with lower numbers having higher priority. This priority is preferably preset into transfer switch 10 and is not changeable by microcontroller chip U16 in the preferred embodiment of the invention. However, in the absence of a load from one or more higher priority loads, lower priority loads may be supplied, until such higher priority loads return.

Alternatively, microcontroller 55 may be suitably programmed, so that, by appropriate use of the pushbuttons of the display panel, the order of priority of circuits A1–B4 may be owner-selected.

Figure 5:
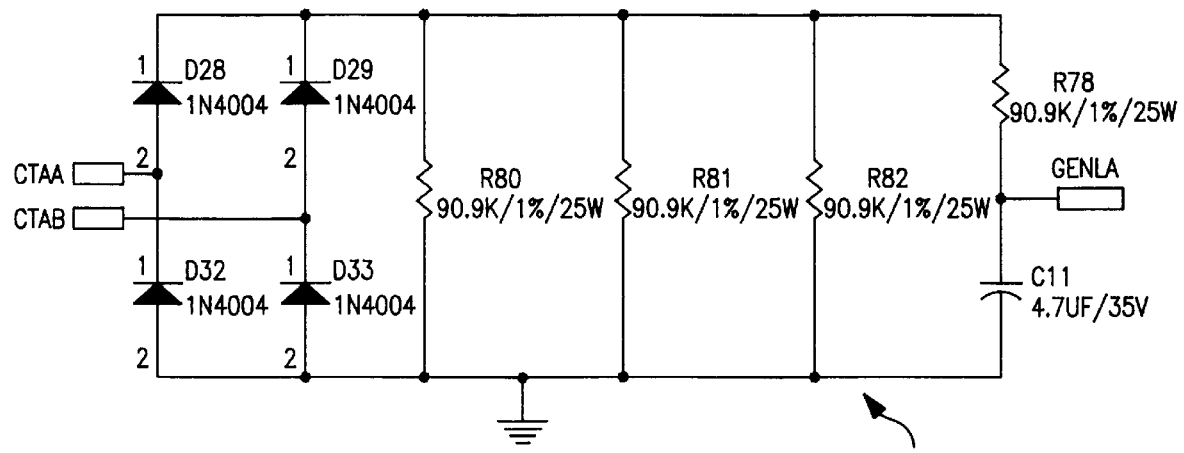
FIG. 5 is a circuit diagram for a signal conditioning circuit for the line current sensing circuit of the microcontroller for the automatic transfer switch of the present invention, for monitoring loads on the generator during operation.
Figure 6:
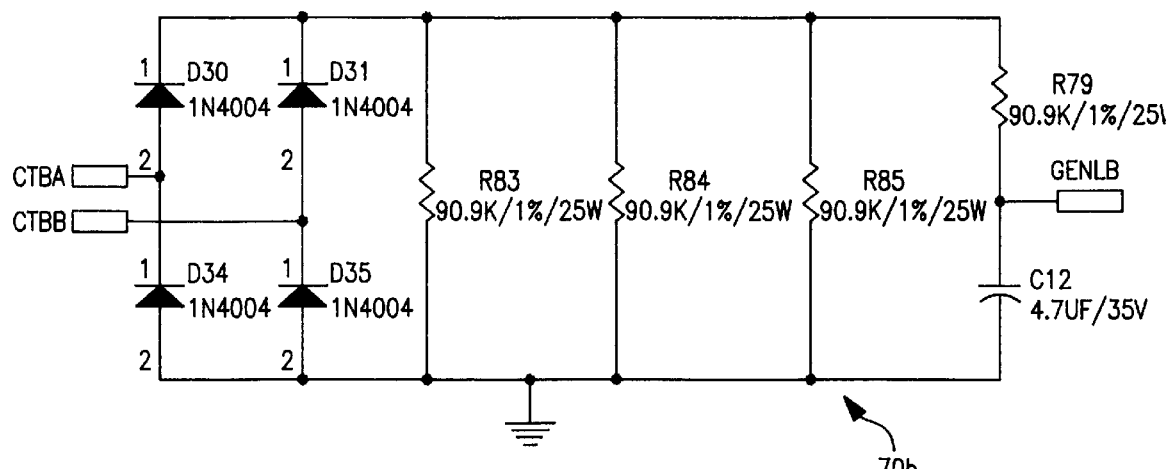
FIG. 6 is a circuit diagram for a signal conditioning circuit for the line current sensing circuit of the microcontroller for the automatic transfer switch of the present invention, for monitoring loads on the generator during operation.

Microcontroller chip U16 then monitors the total current load on the generator (current sensor 70 of FIG. 1*b*), in order to determine whether, according to the programmed-in operating parameters, it is appropriate to cut out lower priority loads until the total load on the generator drops sufficiently to reinstate those dropped loads. In this manner, the number of circuits able to be supplied with generator power is maximized while keeping the generator load below its maximum operating limit. FIGS. 1b, 2, 5 and 6 illustrate the circuitry, portions 70a and 70b of current sensor 70, for this current monitoring function. Current transformers 97, 98 (FIG. 1) (which may be of conventional configuration) are used to sense the currents in generator input lines Gen A and Gen B, and produce signals CTAA, CTAB and CTBA, CTBB (FIGS. 5 and 6) These signals are conditioned by circuitry 70a and 70b (FIGS. 5 and 6) such that if currents of Gen A and Gen B rise, then the DC voltage level on the lines for output signals GENLA and GENLB rise. Output signals GENLA, GENLB of FIGS. 5 and 6 are denominated $I_{GA}$, $I_{GB}$, respectively in FIG. 2, as inputted into microcontroller chip U16.

As microcontroller chip U16 monitors the load on the generator, it cuts in or out circuits A1–B4, in accordance with the parameters generally described herein and programmed into the microcontroller 55, using the corresponding relay drivers RDA1–RDA8, shown in FIG. 7. Preferably, microcontroller 55 is suitably programmed so that when any given load is shed, the transient memory in microcontroller 55 will sense and store information corresponding to the amount by which the total load dropped when the load was shed. While monitoring the running average total loading of the system, microcontroller 55 will note when a drop in total load, equivalent to the stored amount occurs, thus creating sufficient "room" in the total load for, or excess generator capacity to restore, the previously dropped load.

As the generator continues to supply back-up power, transfer switch 10, employing the load shedding capability described herein, continues to address the varying load conditions. Transfer switch 10 continues to monitor the utility line voltage, employing voltage sensor 75, and the associated circuitry of FIG. 4, and the reverse of the process described hereinabove, for sensing utility line voltage failure.

When a utility line voltage is sensed, that is at or above the preselected nominal value (indicating minimum acceptable utility line voltage), and the voltage remains at or above that nominal value, for a predetermined minimum period of time (e.g., 60 seconds), microcontroller 55, according to its programming, determines that it is appropriate to switch back to the utility line voltage supply. The appropriate signals are given to relay drivers 31=>38 to connect the household circuits to the input Lines A1=>B4. Thereafter, microcontroller 55, after an appropriate generator cool down period (e.g., 60 seconds), toggles or otherwise changes the GENRUN signal, causing the generator to shut down. Microcontroller 55 then returns to the original "standby" mode, monitoring the utility line for possible failure. The total run time of the generator and/or time since last maintenance may be recorded in transient memory in chip U16.

In the preferred embodiment, output circuits A1 and B1 are driven or transferred in unison. This allows proper voltage to 240V loads, like well pumps, etc.

Transfer switch 10 is preferably provided with a display panel 40 (FIG. 1b), that has a plurality of LED's for indicating certain conditions of the generator, the battery, etc. For example, four LEDs may be provided, for indicating "Battery Charger ON", "Generator Running", "Generator Failure" (indicating that a GENRUN signal is being sent, but no output voltage is being detected), and "Line OK" conditions. The "Battery Charger ON" LED may begin blinking rapidly when charging a substantially depleted battery, but will blink less often, as the battery charges.

In addition, a numeric or alphanumeric LCD display may be provided, which may be of conventional configuration, and driven by suitable programming, to provide the following messages, either continuously, or by appropriately sequenced actuation of the switches SW1, SW2, or by entering instructions on a suitably provided alphanumeric keypad: "Low Batt" warning—indicating that utility line voltage is available, but the battery is not charging properly; real-time voltage readings for both the utility line input and the generator line input; real-time current readings for the generator—$I_{GA}$ and $I_{GB}$; the accumulated generator run time (both since last reset and since initial activation of the transfer switch, if desired and so programmed); and finally the transfer switch configuration settings as to current overload levels, and voltage transfer levels (utility to generator and generator to utility, if different).

Transfer switch 10 may be provided with a variety of functions, employing the circuitry described hereinabove and illustrated in FIGS. 1b–11, and suitably programmed into microcontroller 55, employing conventional programming techniques.

One such function is a test function. Switch SW1 (FIG. 2) may be connected to microcontroller 55, to initiate a test program, suitably programmed to quickly cycle the system, by starting up the generator, obtaining a valid voltage, switching over to the generator, and switching back. Preferably, microcontroller 55 will be programmed to then exercise the system at a set period of time (e.g., 14 days), following the initial test of the system, at the same time of day as the initial test. Using the display panel input keys, the time and date of the exercise function can be manually altered.

Another function is an alarm function. Preferably, microcontroller 55 is programmed to monitor the elapsed time for each session of operation of the generator, as well as total elapsed time from session to session. Depending upon the anticipated endurance of the generator (presuming a finite fuel supply), a maximum endurance may be presumed (e.g., 6 hrs). In addition, a safety margin (e.g., 2 hours) may be established. Using the foregoing numbers for an example, after a total run time of four hours, microcontroller 55 generates an alarm signal is generated, for actuating an annunciator, for reminding the operator to check fuel and/or oil, for refill and/or change, or other maintenance. Microcontroller chip U16, pin 24 may be used to drive an audible alarm.

The alarm may be a series of sequential beeps, which begins when the margin of safety threshold is encountered. The alarm may have a progressively larger duty cycle, as more time lapses, until at the extreme endurance limit, the duty cycle becomes 100%. Alternatively, microcontroller 55 may be programmed, so that when the initial margin of safety threshold is arrived at, the alarm may be at a certain frequency and/or volume. The alarm may be continuous, or it may be programmed to stop after a predetermined number of cycles. For example, after two minutes after the initial alarm, the alarm will stop, and then begin again, after another predetermined period of time, for example, 10 or 15 minutes. The alarm may be configured so that as the ultimate endurance limit is approached, the frequency and/or volume of the alarm may increase, and/or the duration of the alarm cycle may increase and/or the gap between alarms may shorten. Alternatively, the alarm may be continuous until a silence/reset button is actuated, with the frequency/volume of the alarm increasing over time.

Alarm silence/reset pushbutton switch SW2 (FIG. 2) may be provided, for both silencing the alarm, and for resetting the microcontroller 55 memory, with respect to the total elapsed time for running the generator, between refuelings. In operation, a first actuation of pushbutton SW2 may serve to (temporarily) silence the alarm. However, microcontroller 55 may be suitably programmed so that the elapsed time is not reset, and if the button is not actuated a second time within a set period of time (e.g., five minutes), the alarm will sound again, until such time as two actuations, within the prescribed period of time, occur.

Switches SW1 and SW2 may be conventional momentary switches.

An alarm may also be programmed to sound in the event of generator failure, as described hereinabove.

An additional function is that relays for the A1 and B1 outputs from the generator are configured to be ganged to accommodate 240V loads. As shown in FIG. 2, in the preferred embodiment, a single signal is provided for the relays for outputs A1 and B1. In an alternative embodiment of the invention, the relays for outputs A1 and B1 may be separately driven, in descending priority order, in concert with the remaining output relays. In a still further alternative, this function may be user-programmable, through the display panel, by suitably programming microcontroller 55.

Transfer switch 10 will be provided with a built-in overload tolerance, to prevent unnecessary load shedding. The permissible time period of the overload may be a factory-preset value, measured in seconds. The trip level in amperes, may be configured to be installer adjustable, in order to set the trip level, as a function of the FLA (Full Load Amps) rating of the generator to which the transfer switch is being matched. One reason for providing a settable trip level is that the relative capacities of the transfer switch and the generator may not be precisely matched. For example, the FLA rating of the generator may be 60A, while the maximum rating of the transfer switch may be 100A. Accordingly, it would be desirable for the consumer to reset the trip level of the transfer switch down to the capacity of the generator, to protect the generator.

Such programmability may be provided by inputs through the pushbuttons of the display panel. Alternatively, a plurality of dipswitches may be provided on the circuit board for the microcontroller 55.

The present invention is believed to have several advantageous features, which represent significant improvements over prior art transfer switches. Load startup sequencing is provided, by appropriate programming of microcontroller 55, so that upon initial switchover to generator operation, not all of outputs A1–B4 (or higher, if additional circuits are provided) are brought on line to the generator at once. Programming is provided such that the highest priority circuit(s) A1–B1 are brought on line first. Such high priority circuits may represent heavy inrush/high start current loads (well pumps, motors, etc.) Then after a preselected and preprogrammed period of time, the total load on the generator is monitored, and if the actual total load is sufficiently below the preprogrammed limits, additional lower priority loads (light/low inrush loads) are added. The advantage to such a scheme is that the ability of the generator to pick up and start such loads without stalling or tripping protection (breakers, fuses, etc.) is increased.

Another advantageous feature has been mentioned hereinabove, namely intelligent load shedding and restoration. Microcontroller 55, and the associated sensing and conditioning circuits, sense generator line current and calculate total power, to facilitate intelligent load shedding and restoration. This will avoid overloading the generator either with lines A or B current or total power (the summation of phase A and phase B power) and making the generator stall or engage trip protection. Load shedding avoids the necessity of oversizing the generator and permits a larger combination of loads to be supported by the generator than the total load rating of the generator.

Excess loads will be automatically shed and restored when the intermittent load combination falls back to acceptable limits as configured into microcontroller 55. For example, microwave ovens, water pumps, air conditioning compressors, etc., create large but intermittent and transient loads. When such loads turn off, microcontroller 55 automatically restores previously cut out lower priority loads. Without intelligent load shedding, the total possible connected load combination cannot exceed the total load rating of the back-up generator, even though many individual components of the total load are intermittent and/or transient loads, thus requiring larger capacity (more expensive) generators.

An additional advantage of the present system is that because the unactuated relays default to utility line voltage supply positions when utility line voltage is valid, the printed circuit board, that contains all of the logic circuitry (microcontroller 55, relay drivers, LED drivers, etc.) may be removed, without disturbing any of the circuits or requiring that any loads be dropped.

The transfer switch apparatus 10 of the present invention, as described and illustrated herein, is for a traditional "residential" three wire and ground system, having phase "A", phase "B", neutral and ground connections. Such a system is the 120/240-volt service found in homes and many small businesses. One of ordinary skill in the art, having the present disclosure before them, would be able to readily expand this apparatus and system to three-phase systems, without departing from the scope of the invention. In addition, while the present system has been configured and described in accordance with generally accepted codes and standards applicable in the United States, one of ordinary skill in the art, having the disclosure before them would be able to adapt the system and apparatus of the present invention, to the codes and standards of other countries, such as Canada or Mexico, without departing from the scope of the present invention.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An automatic transfer switch apparatus for use in association with a stand-alone generator, for enabling a stand-alone generator to supply electrical power to a plurality of electrical circuits of a structure, such as a residential structure, in the event of failure of electrical power being supplied to the structure by an electrical utility, the automatic transfer switch apparatus comprising:

a plurality of electrical utility inputs, operably configured to be connected to a corresponding plurality of outputs from a residential electrical distribution box, which outputs are connected, at least indirectly, to a utility voltage source;

a plurality of electrical residential outputs, operably configured to be connected to selected ones of specific electrical circuits within the residence;

a plurality of electrical generator inputs, operably configured to be connected to the voltage output of a stand-alone electrical generator;

a plurality of switches, corresponding and connected to respective ones of the plurality of electrical residential outputs, each switch being operably configured for switching between two contact positions, a first contact position connecting at least one electrical residential output to at least one electrical utility input, and a second contact position connecting the at least one electrical residential output to at least one electrical generator input, the switches being actuatable to move from one of the contact positions to the other of the contact positions, upon receipt of an actuation signal;

a controller, operably configured, following installation of the automatic transfer switch, and connection of same to the voltage outputs and starter circuit of a stand-alone generator, to selected ones of the outputs of a residential electrical distribution box, and to the selected ones of the specific electrical circuits of the residence, to detect utility voltage failure, subsequently start the generator, monitor output voltage of the generator, and, upon detection of a minimum nominal output voltage from the generator, and generate actuation signals to cause the switches to move from respective ones of the contact positions to respective others of the contact positions, the controller further being operably configured to transmit actuation signals to corresponding ones of the switches, according to a preselected prioritized hierarchy, corresponding to prioritized ones of the specific electrical circuits of the residence, wherein switches corresponding to higher priority residential electrical circuits will be actuated to connect the generator output to the residential circuit, before switches corresponding to lower priority residential circuits are actuated to connect the generator output to the residential circuit;

the controller further being operably configured to continue to actuate switches corresponding to successively lower priority residential circuits, until total load on the generator exceeds a predetermined maximum load, the controller further being operably configured to substantially continuously monitor total loading on the generator, de-actuate switches corresponding to lower priority residential circuits, in ascending order of priority, when total load on the generator exceeds a predetermined maximum load, and subsequently reactuate switches corresponding to residential circuits in descending order of priority, when the total load drops below the predetermined maximum load.

2. The automatic transfer switch apparatus according to claim 1, wherein the switches comprise relay switches, which are biased in unactuated first contact positions, connecting electrical residential outputs to electrical utility inputs, and which, upon actuation, are moved to actuated second contact positions, connecting the electrical residential outputs to electrical generator outputs.

3. The automatic transfer switch apparatus according to claim 2, wherein the switches are solenoid-driven relay switches.

4. The automatic transfer switch apparatus according to claim 1, further comprising:

a utility voltage sensor, operably configured to be connected, at least indirectly, to selected ones of the outputs of a residential electrical distribution box, the selected ones of the outputs of the residential electrical distribution box corresponding to electrical circuits of the residence being designated as having highest priority for supply of electrical power, the utility voltage sensor being operably configured to transmit a signal to the controller representative of the utility voltage source;

the controller reading and evaluating the level of the signal and deciding, based upon preselected parameters, whether the voltage is acceptable or insufficient.

5. The automatic transfer switch apparatus according to claim 1, further comprising:

a generator voltage sensor, operably configured to be connected, at least indirectly, to the outputs of a generator, for sensing the output voltage of the generator, the generator voltage sensor being operably configured to transmit a signal to the controller representative of voltage from the generator, the controller reading and evaluating the level of the signal and deciding, based upon preselected parameters, whether the voltage is acceptable or insufficient.

6. The automatic transfer switch apparatus according to claim 1, further comprising:

a plurality of switch drivers, operably connected to the controller and to the plurality of switches, for successively actuating and deactuating the switches, in accordance to control signals received from the controller.

7. The automatic transfer switch apparatus according to claim 1, further comprising:

a generator load current sensor, operably configured to be connected, at least indirectly, to the electrical generator inputs, for sensing the total load current of the residential circuits on the generator, the generator load current sensor being operably configured to transmit a signal to the controller representative of generator loading imposed by the residential circuits, the controller reading and evaluating the signal, and deciding, based upon preselected parameters, whether the loading is acceptable or excessive.

8. The automatic transfer switch apparatus according to claim 1, wherein the controller is further operably configured to automatically exercise the generator at predetermined regular intervals.

9. The automatic transfer switch apparatus according to claim 1, wherein the controller is further operably configured to monitor at least one of total elapsed running time of the generator and total elapsed time from last maintenance, and to provide at least one alarm to an operator to provide maintenance of the generator after a predetermined total elapsed time.

10. The automatic transfer switch apparatus according to claim 1, wherein the controller further comprises:

a display and input panel for enabling an operator to input into programmable memory instructions for a plurality of control parameters, the display and input panel containing at least one of a plurality of LEDs, an alphanumeric LCD and at least one of a plurality of pushbuttons, an alphanumeric keypad.

11. The automatic transfer switch apparatus according to claim 1, wherein the controller further comprises:

at least one of non-volatile preprogrammed memory, writable memory for storage of data inputted by an operator, writable memory for storage of data representative of numerical values for electrical conditions sensed by the automatic transfer switch apparatus.

\* \* \* \* \*